(12) United States Patent
Craig et al.

(10) Patent No.: US 8,528,393 B2
(45) Date of Patent: Sep. 10, 2013

(54) WHEEL POSITION DETERMINATION USING REVOLUTION COUNTER

(75) Inventors: Philip Craig, Antrim (IE); Samuel Strahan, Antrim (IE); William Stewart, Antrim (IE)

(73) Assignee: Schrader Electronics Ltd., Northern Ireland (GB)

( * ) Notice: Subject to any disclaimer, the term of this patent is extended or adjusted under 35 U.S.C. 154(b) by 256 days.

(21) Appl. No.: 13/034,962

(22) Filed: Feb. 25, 2011

(65) Prior Publication Data

US 2011/0209536 A1 Sep. 1, 2011

Related U.S. Application Data

(60) Provisional application No. 61/339,015, filed on Feb. 26, 2010.

(51) Int. Cl.
*E01C 23/00* (2006.01)
*G01M 17/02* (2006.01)
*B60Q 1/00* (2006.01)

(52) U.S. Cl.
USPC ............................. 73/146; 340/440; 340/447

(58) Field of Classification Search
USPC .......................................... 73/146; 340/447
See application file for complete search history.

(56) References Cited

U.S. PATENT DOCUMENTS

| | | | | |
|---|---|---|---|---|
| 5,963,128 A * | 10/1999 | McClelland | .................... | 340/447 |
| 6,246,316 B1 * | 6/2001 | Andsager | ..................... | 340/444 |
| 6,466,887 B1 * | 10/2002 | Weinbrenner | ................ | 702/141 |
| 6,486,773 B1 * | 11/2002 | Bailie et al. | .................... | 340/445 |
| 6,580,365 B2 * | 6/2003 | Starkey | .......................... | 340/447 |
| 6,864,785 B2 * | 3/2005 | Marguet et al. | ............... | 340/447 |
| 6,888,446 B2 * | 5/2005 | Nantz et al. | .................... | 340/433 |
| 6,904,796 B2 * | 6/2005 | Pacsai et al. | .................. | 73/146.8 |
| 6,920,785 B2 * | 7/2005 | Toyofuku | ......................... | 73/146 |
| 6,963,274 B2 * | 11/2005 | Saheki et al. | .................. | 340/447 |
| 7,023,334 B2 | 4/2006 | Fischer | | |
| 7,234,345 B2 * | 6/2007 | Watabe et al. | ............... | 73/146.5 |
| 7,253,726 B2 * | 8/2007 | Okubo | .......................... | 340/447 |
| 7,336,161 B2 * | 2/2008 | Walraet | ......................... | 340/442 |
| 7,423,532 B2 * | 9/2008 | Stewart et al. | .............. | 340/572.1 |
| 7,427,915 B2 * | 9/2008 | Ogawa et al. | ................. | 340/442 |
| 7,508,299 B2 * | 3/2009 | Thomas | ......................... | 340/438 |
| 7,557,698 B2 * | 7/2009 | Osumi et al. | .................. | 340/442 |
| 8,085,142 B2 * | 12/2011 | Kawase et al. | ................ | 340/447 |
| 2003/0020605 A1 * | 1/2003 | Starkey | .......................... | 340/447 |
| 2005/0179530 A1 | 8/2005 | Stewart | | |
| 2006/0044125 A1 * | 3/2006 | Pierbon | ......................... | 340/442 |
| 2009/0088939 A1 * | 4/2009 | To et al. | ........................... | 701/72 |
| 2009/0173149 A1 * | 7/2009 | Bork et al. | ....................... | 73/146 |
| 2010/0324858 A1 * | 12/2010 | Pannek et al. | ................. | 702/141 |
| 2011/0132081 A1 * | 6/2011 | Lee et al. | ..................... | 73/146.5 |

* cited by examiner

*Primary Examiner* — Lisa Caputo
*Assistant Examiner* — Jamel Williams
(74) *Attorney, Agent, or Firm* — Holland & Hart LLP

(57) ABSTRACT

A wheel position determination system and method to count wheel revolutions in a wheel unit of a tire monitoring system. An indication of the count is transmitted, optionally along with an indication of a left/right side position of the wheel on the vehicle, and an identification unique to the transmitting wheel unit, to a central controller of the tire monitoring system. In the central controller of the tire monitoring system, the count is compared with wheel speed information for the vehicle, such as from an ABS system, to determine if one wheel on each side of the vehicle is rotating at a different speed. Based at least in part upon a determination that each wheel speed is unique, a determination of wheel location may be made.

20 Claims, 3 Drawing Sheets

WHEEL POSITION DETERMINATION USING REVOLUTION COUNTER

BACKGROUND

This disclosure relates generally to Tire Pressure Monitoring (TPM), more particularly to locating TPM wheel units with respect to a particular vehicle, and specifically to determining wheel position of tire pressure monitoring wheel units using revolution counter information from the tire pressure monitoring wheel units.

Systems may have been developed to monitor characteristics such as tire pressure and/or tire temperature of a vehicle and to report the characteristics to a receiver at a central monitoring station using radio transmissions. A monitor is located at each tire and periodically takes a measurement of the tire characteristics. The monitor then transmits the results of the measurement in a radio frequency transmission to the central monitoring station which produces an alarm or a display in response to the measurement.

One problem with such systems has been the need to program the location of the transmitters at the central station. To be fully useful, the tire characteristic data is preferably associated with the tire which originated the measurement when presenting a display or alarm. Each monitor typically can transmit unit identification information with the measurement. The tire monitor is preferably activated to produce this information and the information is then conveyed to the central station and associated with the position of the tire.

Existing solutions employed to provide such position information include Radio Frequency Detector (RFD) based systems. These systems employ one or more RFD's to determine which wheel a transmission originates from using received signal strength or other signal attributes. Problematically, such RFD-based systems require cables running from a central receiver to each RFD, typically four RFDs, each located in a wheel arch.

Received Signal Strength Indicator (RSSI) based systems determine front and rear wheel positions by comparing received signal strength from each of the wheel units. Such systems are typically prone to RF power variations and can have problems with attaining a sufficient RF margin between front and rear.

LF (Low Frequency) triggers, typically coils in each wheel arch (or elsewhere nearby) may be employed to activate the wheel unit, which responds in a manner which indicates which LF trigger activated it, thus allowing the receiver to make the wheel position determination in some systems. These systems may have similar problems to those encountered by RFD-based systems.

Many other TPM autolocation systems may use relatively large amounts of power in that the wheel units in such systems transmit more messages or data than typical, and/or include more than the typical components, straining battery resources within the wheel unit.

SUMMARY

The present disclosure is directed to systems and methods which provide location indications of TPM wheel units on a vehicle using revolution counter information and rotation direction information, preferably received from the TPM wheel units.

In accordance with some embodiments, a TPM transmitter transmits information which can be used by a receiver to determine if the wheel unit is on the front or the rear of the vehicle and information which indicates or can be used to determine if the wheel unit is on the left or right side of the vehicle. Front/rear position information from TPM wheel unit may be determined based on the principle the wheels rotate at different speeds depending on factors such as wheel slip, cornering, left side/right side position, differing wheel diameters, drive vs. driven, etc. caused by tire wear, tire type, tire pressure, tire temperature, etc. For example, drive wheels typically have more slip that driven wheels.

Thus, in accordance with such embodiments, each of the wheel units counts the number of wheels revolutions. Over a period of time a difference will accumulate between the front and the rear of the vehicle, based at least on the above mentioned wheel factors. Further, a primary driving wheel of the driving wheel pair may even more clearly indicate which left or right wheel is on which axle. A wheel unit preferably counts the number of revolutions and then transmits data, preferably including revolution counter information, when a specific number of wheel revolutions are accrued. In some embodiments, such a transmission may be sent immediately when a specific number of wheel revolutions has been reached to provide this revolution count data. Alternatively, revolution counter information could be sent after a predetermined time interval, or after a minimum amount information is accumulated to make a determination.

Left and right location information or rotation direction information may be provided from the wheel unit, derived from acceleration sensor or shock sensor signals from sensors disposed within each wheel unit. Such signals may be filtered using a forward frequency loop filtering scheme, or the like. Location information may be provided from the wheel unit, derived from signal strength of the transmitted signal from the sensor.

Thus, an embodiment of the present methods might include counting wheel revolutions in a wheel unit of a tire monitoring system. This counting may comprise counting the number of shock signal signals received from one or more shock sensors, or other acceleration measuring or sensing device, mounted in a wheel unit. Furthermore, signal strength information may be used to alone or together with other information to determine tire position on the vehicle.

Then an indication of the count, along with an indication of a left/right side position of the wheel on the vehicle and identification unique to the transmitting wheel unit, may be transmitted to a central controller of the tire monitoring system. The aforementioned indication of the rotation count may be provided by transmitting after a predetermined number of rotations or after a predetermined time interval.

In the central controller of the tire monitoring system the count may be compared with wheel speed information for the vehicle to determine if one wheel on each side of the vehicle is rotating at a different speed. This comparison might be made by comparing the rotation count from each wheel unit with wheel speed information from an antilock brake system of the vehicle, or from other information from the vehicle.

Then a determination may be made, based on at least the determination of a difference in wheel rotation speed on each or either side of the vehicle, which wheel unit on a side of the vehicle is mounted on a drive axle of the vehicle.

The indication of a left/right side position of the wheel on the vehicle may be made in the wheel unit or central TPM unit, based on one or more acceleration signals generated by one or more acceleration signals in the wheel unit, such as being based on a lead/lag relationship of the phase of two shock sensor signals generated by shock sensors disposed in the wheel unit.

In accordance with various embodiments, the shock sensor signals may be filtered prior to the counting and/or the making of left/right side or rotation direction determination. This filtering might involve tracking a main frequency component of a first shock sensor signal that is dependent on rotational speed of the wheel in which the wheel unit is mounted by filtering the first signal. Then an adjustable filter having an adjustable cut-off frequency is used to produce a filtered first signal. At least one characteristic of the filtered first signal may be measured and measured characteristic may be compared against a reference value. The cut off frequency may be adjusted if the at least one measured characteristic differs from the reference value by an amount that exceeds a threshold value.

In accordance with an embodiment, a tire monitoring wheel unit might comprise one or more acceleration sensors and a wheel unit controller, as well as a transmitter. The controller might include a module for receiving signals from the acceleration sensor(s) and for determining a direction of rotation of a wheel unit and preferably at the same time determining a number of rotations of the wheel unit. The transmitter may then transmit to a central receiving unit of a vehicle mounting the wheel units, among other information, an indication of a side of the vehicle on which the wheel unit is mounted. This indication is preferably based on the determination of direction of rotation of the wheel unit. The transmitter also transmits an indication of the number of rotations of the wheel and identification unique to the wheel unit.

Thus a tire monitoring system for a vehicle might comprise, in addition to one of such a tire monitoring wheel unit disposed in each wheel of the vehicle, a central controller receiving the transmissions from each of the wheel units. The central controller may compare the rotation count with wheel speed information for the vehicle to determine if one wheel on each side of the vehicle is displaying an indication of slip. Based on the any rotation speed differential for wheels on each or either side of the vehicle the central controller may further determine which wheel unit on a side of the vehicle is mounted on which axle of the vehicle.

As noted above, in such a system the acceleration sensors may be shock sensors and determining the number of rotations of the wheel comprises counting the number of shock signal signals received from one or more shock sensors mounted in a wheel unit. Further, the indication of a left/right side position of the wheel on the vehicle may be made based on a lead/lag relationship of the phase of two shock sensor signals generated by two shock sensors.

The previously discussed filtering may be carried out, preferably in each wheel unit, but also possibly in the central TPM controller prior to the counting and/or rotation direction determination using a filter comprising an input for receiving a first shock sensor signal. An adjustable filter is arranged in the filter to receive the first signal and to produce a filtered first signal, the adjustable filter preferably has an adjustable cut off frequency. A filter controller is arranged to measure at least one characteristic of the filtered first signal and to compare the at least one measured characteristic against a reference value. The filter controller is preferably co-operable with the adjustable filter to adjust the cut off frequency if the at least one measured characteristic differs from the reference value by an amount that exceeds a threshold value. It will be appreciated that other filtering techniques may be used with this system.

Advantageously, the present systems and methods may not require additional cabling, therefore installation may be simpler than in RFD and/or LF trigger-based systems. Also no RFD's or LF trigger devices are required in the present systems or by the present methods for autolocation. However, they may be used to augment this system.

Unlike RSSI-based autolocation systems, the present systems and methods may not require as much in the way of system testing, such as needed in RSSI-based autolocation systems to determine if there is a sufficient RF margin between front and rear.

The present systems and methods may also require fewer transmissions to locate the wheels and thus do not use as much power or run the risk of running afoul FCC or similar regulations that limit the number or periodicity of intentional transmissions.

Advantageously, the present systems and methods can largely be employed in existing vehicle TPM systems in that the wheel unit enables front/rear determination and right/left determination, without worry about the location of the receiver, and with minimal software and/or hardware modification to the existing TPM system.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The accompanying drawings, which are incorporated in and form part of the specification in which like numerals designate like parts, illustrate embodiments of the present disclosure and together with the description, serve to explain the principles of the disclosure. In the drawings.

DETAILED DESCRIPTION

Figure 1:
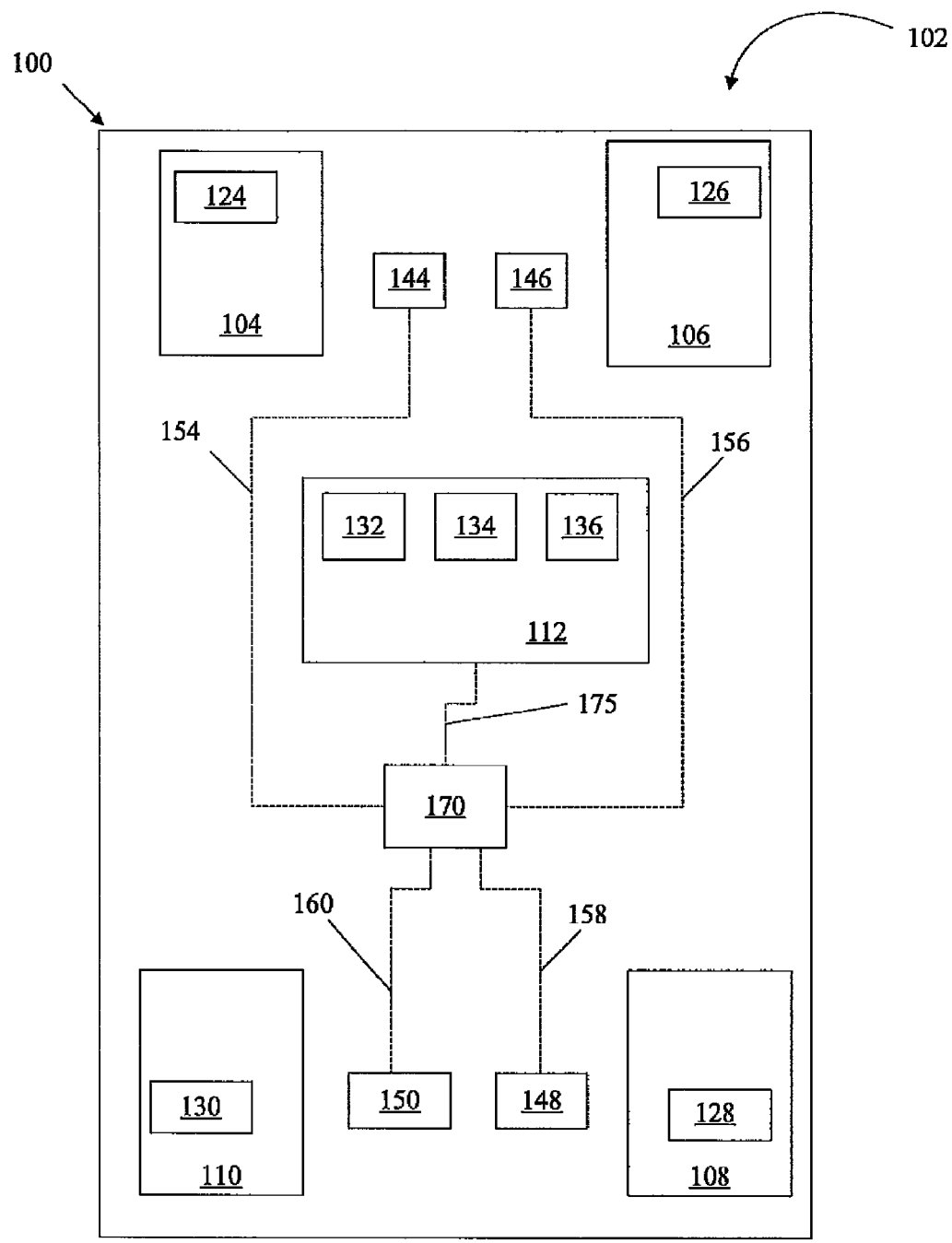
FIG. 1 is a block diagram of an embodiment of a tire monitoring system (TMS) shown in conjunction with parts of a vehicle according to some embodiments.

Referring now to FIG. 1 of the drawings, there is shown, generally indicated as 102, a tire monitoring system (TMS) shown in situ on a vehicle 100. For reasons of clarity, only those portions of the vehicle 100 and TMS 102 that are helpful in understanding the present disclosure are shown.

The vehicle 100 includes wheels 104, 106, 108, 110, each wheel including a tire mounted on a rim. The TMS 102 includes a control unit 112 (such as an vehicle Engine Control Unit (ECU), or a Body Control Module (BCM)) and tire monitors 124, 126, 128, 130, typically generally referred to as sensors, transmitters, wheel unit, and/or the like. The tire monitors (or wheel units) 124, 126, 128, 130 measure tire characteristics and transmit corresponding tire data for reception and processing by the control unit 112. Typically, a respective tire monitor is associated with each wheel of the vehicle 100.

In some embodiments, the tire monitors are capable of measuring tire pressure and of transmitting data to the control unit 112, including data representing the measured tire pressure and usually also identification information uniquely identifying the respective tire monitor. Each of the tire monitors 124, 126, 128, 130 includes a suitably powered wireless transmitter, which may be a battery powered, or other powered, radio frequency (RF) transmitter, and a pressure sensor for measuring the pressure of the gas (usually air) within the tire. In such embodiments, the system 102 may be referred to as a tire pressure monitoring system (TPMS).

Any suitable control unit may be used in the system 102. By way of example, in the illustrated embodiment, the control unit 112 includes a controller 132, a memory device 134 and a receiver 136 for receiving wireless transmissions from the tire monitors.

Vehicle 100 might also include an Antilock Brake System (ABS). Such an ABS may be comprised of a sensor unites 144, 146, 148 and 150, providing signals, via links 154, 156, 158 and 160 to ABS central unit 170. Central ABS unit 170 may be connected to TMS central unit 112 (and controller 132) via the vehicle's CAN bus 175, as an embodiment. For sharing ABS wheel speed related data for use as described below.

Figure 2:
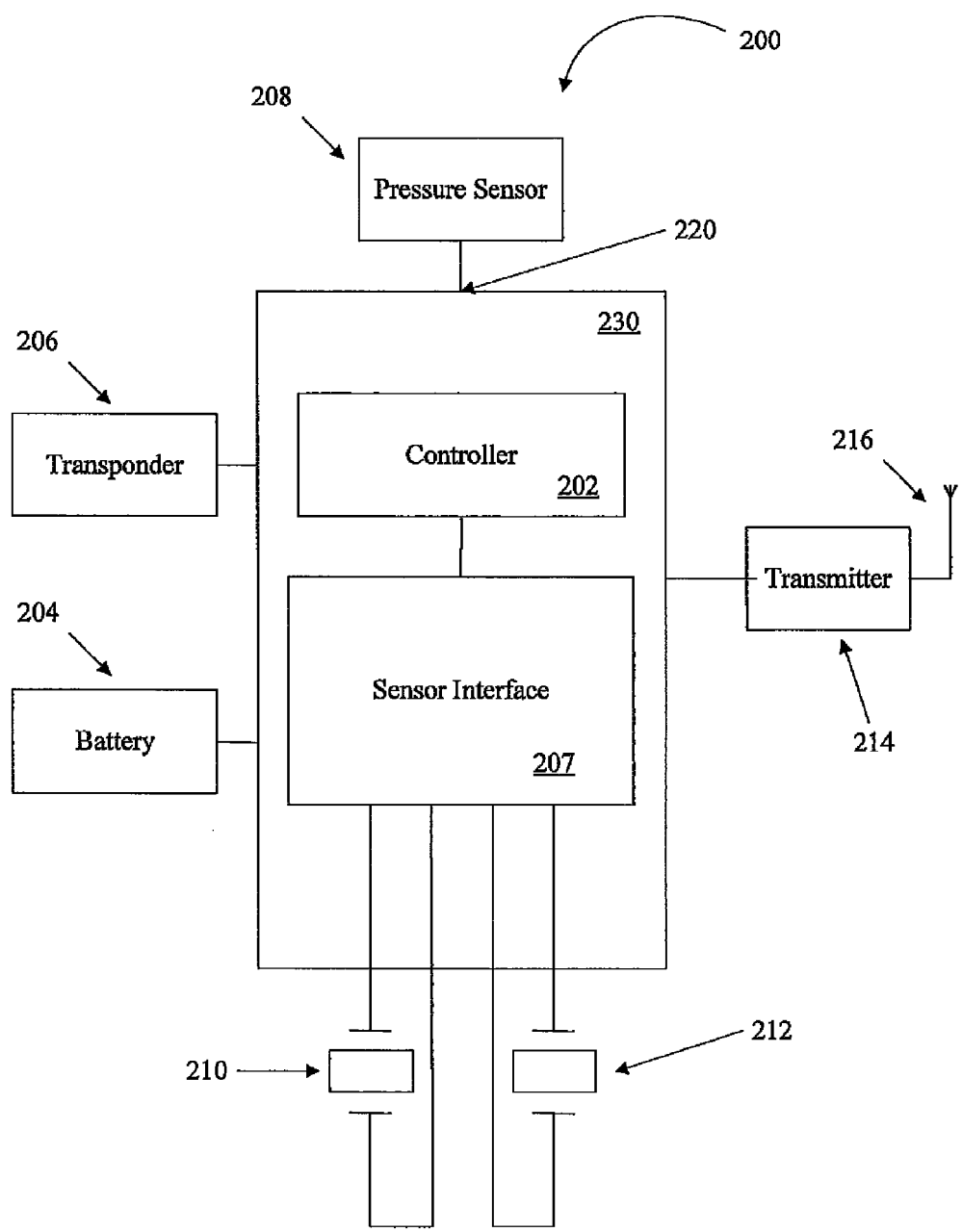
FIG. 2 is a block diagram of a tire monitoring apparatus included in the TMS of FIG. 1.

Referring now to FIG. 2, there is shown a block diagram of an embodiment of a tire monitor (wheel unit) 200. The tire monitor 200 includes a controller 202, a power source such as a battery 204, a transponder coil 206, a pressure sensor 208, one or more piezoelectric motion sensors 210, 212, a wireless transmitter 214 and an antenna 216. In this illustration, the motion sensors 210, 212 each comprise a respective shock sensor of the type that produces an electrical signal in response to being subjected to acceleration, the electrical signal being indicative of, typically proportional to, the experienced rate of change of acceleration. Alternatively, the sensors 210, 212 may each comprise an accelerometer or a microelectromechanical systems (MEMs) sensor, or any other sensor suitable for use for this purpose. The main difference between an accelerometer and a shock sensor is that the output signal from a shock sensor is related to a change of force applied to the shock sensor, whereas the output signal from an accelerometer is proportional to the absolute force applied.

In the illustrated embodiment, the pressure sensor 208 detects the pneumatic air pressure of the tire with which the tire monitor 200 is associated. In alternative embodiments, the pressure sensor 208 may be supplemented with or replaced by a temperature sensor or other devices for detecting tire data. An indication of the tire data is provided by the controller 202 at an input 220.

A shock sensor interface 207 is provided in the tire monitor 200 and is configured to provide the necessary control signals and detect the electrical signals from the shock sensors 210, 212. The shock sensors 210, 212 in one embodiment detect acceleration to produce an output in the form of an electrical charge output signal. The output signal is typically in the order of 1 mV/g. The shock sensor interface 207 receives the electrical output signal, which is analog in nature, amplifies and filters the signal to provide a corresponding processed output signal to the controller 202. The shock sensor interface 207 operates in response to control signals from the controller 202. Preferably, both shock sensors 210, 212 can share the same interface 207 via multiplexing.

During use, the controller 202, or a module therein 230, is able to determine at least one aspect of the tire monitor's location, for example whether it is on the left side or the right side of the vehicle, based on electrical signals produced by the shock sensors 210, 212 as the wheel rotates.

The shock sensors 210, 212 may serve as a motion switch or rotational sensor for the tire monitor 200. The shock sensors 210, 212 may in combination form a dual axis accelerometer and determine first acceleration along a first axis and second acceleration along a second axis. The shock sensors 210, 212 are one example of a force sensor, displacement sensor, or rotation sensor. The shock sensors may also be referred to generically as piezoelectric rotation sensors. Other types of piezoelectric rotation sensors or accelerometric devices may be used in place of, or along with, the shock sensors described herein. Accelerometric devices may include shock sensors, accelerations sensors, and/or other sensors, etc.

Hence, in the illustrated embodiment, the shock sensors 210, 212 are used both as a motion switch, to determine when the tire is moving, and to determine what side of the vehicle the tire is located on. The shock sensors 210, 212 are coupled with the controller 202.

Any number of methods may be used to provide the right/left and/or clockwise/counter-clockwise information. For example, commonly owned Wacker, U.S. Pat. No. 6,204,758 discloses a system to automatically determine wheel position for automotive remote tire monitoring system, which is incorporated herein by reference. Therein, it is taught that during different operating conditions, tires mounted on a vehicle experience acceleration which can be detected at a tire monitor. The polarity of the acceleration varies in accordance with the location of the tire monitor on the right or left side of the vehicle. The acceleration information can be used to determine position of the tire monitor and its associated wheel on the vehicle. In particular, Wacker teaches that tire monitors on opposing sides of the vehicle will experience oppositely directed tangential acceleration. In one example, the sign of the detected tangential acceleration will correspond to the side of the vehicle, with positive acceleration indicating location on the left side of the vehicle and negative acceleration indicating location on the right side of the vehicle.

However, preferably, systems and methods to provide the right/left and/or clockwise/counter-clockwise information such as disclosed in commonly owned Stewart, et al., U.S. Pat. No. 7,367,227, entitled Determination of Wheel Sensor Position Using Shock Sensors and a Wireless Solution are generally used in the present disclosure. Therein, first shock sensor 210 produces a first motion signal, second shock sensor 212 produces a second motion signal and controller 202 is coupled to the first shock sensor and the second shock sensor. A controller circuit is configured to determine right side-left side position information for the tire monitor based on a lag-lead relationship of the first motion signal and the second motion signal. For example, as a wheel rotates, two waveforms are produced by the shock sensors, which are out of phase by 90 degrees. Depending on the direction of rotation of the wheel, clockwise or counterclockwise, one axis will lead or lag the other axis. Shock sensors convert the acceleration they detect into signals such as voltage waveforms. These signals, including a first signal for acceleration on one axis and a second signal for acceleration on a second axis, can then be amplified, filtered and converted to digital data by the controller of the tire monitor. Position information about position of a tire including the tire monitor can then be determined based on the signal.

A decision can subsequently be made as to whether the tire monitor is rotating in a clockwise or counterclockwise direction, based on the sampled signals from the shock sensors. The position information, such as right hand side positioning or left hand side positioning can be determined from the direction of rotation. In particular, the controller of the tire monitor can determine a lag/lead relationship of the first acceleration signal for the x axis and the second acceleration signal of the z axis. The controller determines whether the x axis signal leads or lags the z axis signal. This lag/lead information will indicate either clockwise or counterclockwise rotation for the wheel or tire associated with the tire monitor. Based on the clockwise or counterclockwise rotation information, and information that the vehicle is traveling forward rather than backing up, the controller can determine whether the tire monitor is on the right-hand side or the left-hand side of the vehicle. For directional rotation, the disclosed method and apparatus analyze the alternating +1 g/−1 g component.

Controller 202 may be implemented by any suitable means, for example a microprocessor, microcontroller, an Application Specific Integrated Circuit (ASIC), or other suitable data processing device programmed to perform the functions described herein.

The output signal produced by each shock sensor comprises a main signal component and other signal components in the form of signal noise. The frequency and amplitude of the noise components are sufficiently close to the frequency and amplitude of the main signal component that it can be difficult to reliably detect the main signal component. Further, the frequency of the main signal component is determined by, i.e. varies with, the rotational speed of the wheel.

In the present systems and methods a tracking filter may be employed, such as in wheel unit controller 202. Such a Tracking Filter Apparatus for Wheel Monitoring Systems is disclosed in U.K. Basic Patent Application Number 0916369.2, filed Sep. 18, 2009, which is incorporated herein by reference. Such a tracking filter apparatus tracks a signal that has a varying main frequency and preferably has an adjustable filter and a filter controller arranged to measure the amplitude of the filtered signal and to compare amplitude against a reference value. The filter controller preferably adjusts the cut off frequency of the filter if the measured amplitude differs from the reference value by an amount that exceeds a threshold value. Preferably, the filter controller adjusts the cut off frequency such that the main frequency lies within a "roll off" region of the filter's frequency response. Such a tracking filter may be used to track signals that are produced by the aforementioned shock sensors in a wheel unit of the present disclosure to provide one or more filtered shock sensor signals from each wheel unit.

Also, preferably, in accordance with the present systems and methods controller 202 in each wheel unit (or a module therein) counts the number of wheel revolutions and the tracking filter or similar apparatus provides accurate left/right information, or information such as the aforementioned filtered shock sensor signal(s) that can be used to determine left/right wheel unit information in wheel unit controller 202. In accordance with various embodiments of the present disclosure transmitter 214 can transmit revolution counter information when the revolution counter reads a pre-determined value. Alternatively, to indicate a rotation count the wheel unit can be configured to immediately transmit when a specified number of wheel rotations has been reached or after a predetermined time.

Alternatively and/or as a part of determining both rotation direction and rotation count the present systems and methods may employ the following steps. Circuitry in wheel unit controller 202 may receive filtered and/or unfiltered shock sensor signals from the shock sensors in the wheel unit. A rotation direction decision is preferably made using these signals in a method such as described above and/or using other methods such as the detection of tire impacts with the ground using the shock sensor data, or the like. A determination may then be made as to whether the rotation direction decision was correct. (This determination can be based on a number of factors, such as the degree of certainty of lead/lag phase relationship of the shock sensor signals, prior determination, etc.) Regardless of whether the determination is correct or not, it is counted, and accumulated to provide the aforementioned rotation count. In other words, both rotation determinations deemed to be accurate, and those not deemed to be accurate are counted to provide the desired rotation count. This rotation count is communicated to TPM controller 112 in a manner such as described above, i.e. by transmitting when a certain rotation count is achieved or by including rotation count data in pressure/temperature measurement transmissions from the wheel unit to the TPM controller 112.

In accordance with the present disclosure, control unit 112 can compare the revolution count information received, or deduced from the wheel unit transmission, to speed information, such as may be provided by vehicle ABS controller 170 and/or speed sensor/speedometer. In an embodiment, depending on whether the front or the rear wheels are the driving wheels, among other factors, a difference in rotation count between front and rear should be detected. As is well known in the art driving wheels will typically have a higher revolution count, due to slip, than non-driving wheels. Thus, a higher revolution count for a particular wheel unit should, in accordance with the present disclosure, indicate that the wheel unit is on the driven axle of the vehicle. This determination can be further refined and/or confirmed by comparing the wheels indicated by the shock sensor signals or other indication to be on the same side of the vehicle. For example, the front right wheel on a front wheel drive vehicle should rotate clock-wise, as may be indicated by shock sensor signal (s), and should rotate at a higher rate, over time than the right rear wheel, which should also be determined as rotating clockwise. In contrast the left-side wheels of this vehicle should rotate counter-clockwise, but the front-left wheel should rotate more, over time, than the rear-left.

Figure 3:
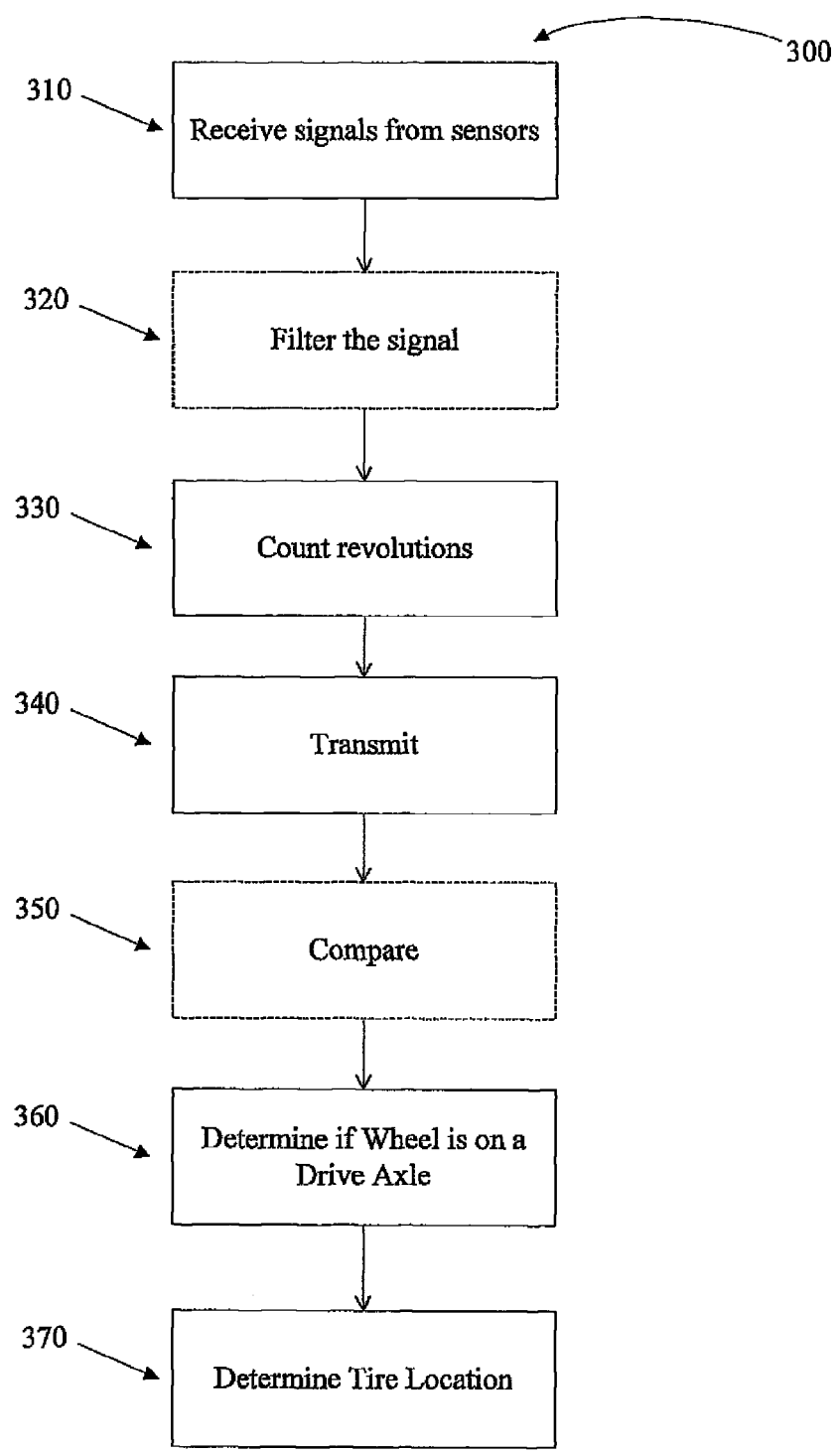
FIG. 3 is a block diagram of a method for determining location according to some embodiments.

FIG. 3 is a flow diagram of a method for determining tie position according to some embodiments. At 310, method 300 may include the step of receiving signals from sensors. The sensors may include shock sensors, accelerometers, or any other sensor suitable for this purpose.

At 320 the sensor signal may optionally be filtered. In accordance with various embodiments, the shock sensor signals may be filtered prior to the counting and/or the making of left/right side or rotation direction determination. This filtering might involve tracking a main frequency component of a first shock sensor signal that is dependent on rotational speed of the wheel in which the wheel unit is mounted by filtering the first signal. Then an adjustable filter having an adjustable cut-off frequency is used to produce a filtered first signal. At least one characteristic of the filtered first signal may be measured and measured characteristic may be compared against a reference value. The cut off frequency may be adjusted if the at least one measured characteristic differs from the reference value by an amount that exceeds a threshold value. It will be appreciated that many other filtering and/or amplifying techniques may be used to accomplish the same general purpose.

At 330, method 300 may include tire revolutions may be counted. Left and right location information or rotation direction information may be provided from the wheel unit, derived from acceleration sensor or shock sensor signals from sensors disposed within each wheel unit. Such signals may be filtered using a forward frequency loop filtering scheme, or the like.

Thus, an embodiment of the present methods might include counting wheel revolutions in a wheel unit of a tire monitoring system. This counting may comprise counting the number of shock signal signals received from one or more shock sensors, or other acceleration measuring or sensing device, mounted in a wheel unit.

At 340, method 300 may include transmitting data. An indication of the count, along with an indication of a left/right side position of the wheel on the vehicle and identification unique to the transmitting wheel unit, may be transmitted to a central controller of the tire monitoring system. The aforementioned indication of the rotation count may be provided by transmitting after a predetermined number of rotations or after a predetermined time interval.

Method 300 may optionally include the step of comparing at 350. In an embodiment, the central controller of the tire monitoring system the count may be compared with wheel speed information for the vehicle to determine if one wheel on each side of the vehicle is rotating at a different speed. This comparison might be made by comparing the rotation count from each wheel unit with wheel speed information from an antilock brake system of the vehicle, or from other information from the vehicle. As described above, tire position may be determined without comparing to ABS information.

At 360, a determination may be made. Then a determination may be made, based on at least the determination of a difference in wheel rotation speed on each or either side of the vehicle, which wheel unit on a side of the vehicle is mounted on a drive axle of the vehicle.

At 370 the tire location may be determined. The location information may include front/back as well as left/right information. The location may be determined using the information obtained in the above description.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
    counting wheel revolutions in a wheel unit of a tire monitoring system, said wheel unit mounted on one wheel of a vehicle;
    transmitting an indication of the count, and an identification unique to the transmitting wheel unit, to a central controller of the tire monitoring system;
    comparing, in the central controller of the tire monitoring system, the count with wheel speed information for the vehicle to determine if one wheel on each side of the vehicle is rotating at a different speed; and
    determining, based at least in part upon the determination that one wheel is rotating at a different speed than another on each or either side of the vehicle, which wheel unit on a side of the vehicle is located on a drive axle of the vehicle.

2. The method of claim 1, wherein said counting comprises counting the number of sensor signals received from one or more accelerometric devices mounted in the wheel unit.

3. The method of claim 2, further comprising filtering said sensor signals prior to said counting.

4. The method of claim 3, wherein said filtering comprises tracking a main frequency component of a first sensor signal that is at least partially dependent on rotational speed of the wheel in which the wheel unit is mounted, by filtering said first signal, using filter comprising an adjustable filter having an adjustable cut-off frequency, to produce a filtered first signal, measuring at least one characteristic of said filtered first signal, comparing said at least one measured characteristic against a reference value, and adjusting said cut off frequency based at least upon if said at least one measured characteristic differs from said reference value by an amount that exceeds a threshold value.

5. The method of claim 1, wherein said transmitting being carried out after a predetermined number of rotations or a predetermined period of time.

6. The method of claim 1, further comprising transmitting an indication of a left/right side position of the wheel on the vehicle, which comprises an indication of direction of rotation of said wheel.

7. The method of claim 1, further comprising transmitting an indication of a left/right side position of the wheel on the vehicle, which is made in said wheel unit based at least in part on one or more acceleration signals generated by an accelerometric device in the wheel unit.

8. The method of claim 1, further comprising transmitting an indication of a left/right side position of the wheel on the vehicle, which is made in the central controller based at least in part upon one or more acceleration signals generated by one or more acceleration signals in the wheel unit and transmitted to the central controller.

9. The method of claim 1, further comprising filtering said sensor signals prior to one or more of determining said lead/lag relationship or said left/right position, wherein said filtering comprises tracking a main frequency component of a first sensor signal that is at least partially dependent on rotational speed of the wheel in which the wheel unit is mounted by filtering said first signal, based in part upon using an adjustable filter having an adjustable cutoff frequency, to produce a filtered first signal, measuring at least one characteristic of said filtered first signal, comparing said at least one measured characteristic against a reference value, and adjusting said cut off frequency based at least in part upon if said at least one measured characteristic differs from said reference value by an amount that exceeds a threshold value.

10. The method of claim 9, further comprising transmitting an indication of a left/right side position of the wheel on the vehicle, wherein said indication of a left/right side position of the wheel on the vehicle is made in said wheel unit based on a lead/lag relationship of the phase of two accelerometric device sensor signals generated by sensors disposed in the wheel unit.

11. The method of claim 9, further comprising transmitting an indication of a left/right side position of the wheel on the vehicle, wherein said indication of a left/right side position of the wheel on the vehicle is made in said central controller based at least in part upon a lead/lag relationship of the phase of two accelerometric device signals generated by sensors disposed in the wheel unit and transmitted to said central controller.

12. The method of claim 1, wherein said comparing the count with wheel speed information comprises comparing said rotation count from each wheel unit with wheel speed information.

13. A tire monitoring wheel unit, comprising:
an accelerometric device;
a wheel unit controller, said controller comprising a module for receiving signals from said accelerometric device and determining a direction of rotation of a wheel unit mounting said wheel, and a number of rotations of said wheel unit; and
a transmitter capable of transmitting to a central receiving unit of a vehicle, an indication of a side of said vehicle on which said wheel unit is mounted, based at least in part on the determination of direction of rotation of the wheel unit, and transmitting an indication of the number of rotations of said wheel, and transmitting an identification unique to said wheel unit,
wherein said accelerometric device comprises one or more of a shock or acceleration sensor, and said determining a number of rotations of said wheel comprises counting the number of wheel revolution signals received from said one or more shock or acceleration sensor mounted in a wheel unit.

14. The tire monitoring wheel unit of claim 13, wherein said indication of a left/right side position of the wheel on the vehicle is made based at least in part on a lead/lag relationship of the phase of two shock or acceleration sensor signals generated by two of the one or more shock or acceleration sensors.

15. The tire monitoring wheel unit of claim 13, further comprising a filter which comprises:
an input for receiving a first accelerometric device signal;
an adjustable filter arranged to receive said first signal and to produce a filtered first signal, said adjustable filter comprising an adjustable cut off frequency; and
a filter controller arranged to measure at least one characteristic of said filtered first signal and to compare said at least one measured characteristic against a reference value, the filter controller being co-operable with said adjustable filter to adjust said cut off frequency based at least in part upon if said at least one measured characteristic differs from said reference value by an amount that exceeds a threshold value.

16. The tire monitoring wheel unit of claim 13, wherein said transmitter transmits, after one or more of a predetermined number of rotations or a time period, said indication of the number of rotations of said wheel.

17. A tire monitoring system for a vehicle comprising:
a tire monitoring wheel unit disposed in each wheel of said vehicle, each of said wheel units comprising:
one or more accelerometric devices;
a wheel unit controller, said controller comprising a module for receiving signals from said one or more accelerometric devices and capable of determining a direction of rotation of a wheel mounting said wheel unit, and a number of rotations of said wheel unit; and
a transmitter capable of transmitting, to a central receiving unit, the number of rotations of said wheel;
a central controller capable of receiving the transmissions from each of the wheel units, and further capable of comparing the number of rotations with wheel speed information for the vehicle, to determine if one wheel on each side of the vehicle is rotating at a different speed than the other wheel on the same side, and determining, based at least in part on this determination for each or either side of the vehicle, which wheel unit on a side of the vehicle is located on a drive axle of the vehicle.

18. The system of claim 17, wherein said wheel unit comprises a filter configured to filter said accelerometric device signals prior to said counting, wherein said filter comprises:
an input for receiving a first accelerometric device signal;
an adjustable filter configured to receive said first signal and to produce a filtered first signal, said adjustable filter comprising an adjustable cut off frequency; and
a filter controller configured to measure at least one characteristic of said filtered first signal and to compare said at least one measured characteristic against a reference value, the filter controller being co-operable with said adjustable filter to adjust said cut off frequency based at least in part upon if said at least one measured characteristic differs from said reference value by an amount that exceeds a threshold value.

19. The system of claim 18, wherein said one or the more accelerometric devices comprise one or more of a shock sensor or an acceleration sensor, and said determining a number of rotations of said wheel comprises counting a number of sensor signals received from one or more accelerometric devices mounted in said wheel unit.

20. The system of claim 18, wherein said indication of a left/right side position of the wheel on the vehicle is made based at least in part on a lead/lag relationship of the phase of two sensor signals generated by two sensors.

* * * * *